United States Patent [19]

Palau et al.

[11] Patent Number: 4,483,510
[45] Date of Patent: Nov. 20, 1984

[54] FAST-FIT UNIONS FOR REMOVABLY JOINING PIPES

[75] Inventors: Joseph Palau, Saint-Jorioz; Jean-Luc Burquier, Veyrier du Lac, both of France

[73] Assignee: S.A. Des Etablissements Staubli (France), Faverges, France

[21] Appl. No.: 424,719

[22] Filed: Sep. 27, 1982

[30] Foreign Application Priority Data

Oct. 20, 1981 [FR] France ................ 81 19800

[51] Int. Cl.³ ............................................. F16L 29/00
[52] U.S. Cl. ............................. 251/149.6; 251/149.1; 137/596; 285/DIG. 25
[58] Field of Search ............... 251/149.6, 149.1; 137/596; 285/317, DIG. 25

[56] References Cited

U.S. PATENT DOCUMENTS 4,413,846 11/1983 Oetiker ........................... 285/317

FOREIGN PATENT DOCUMENTS 1503989 12/1967 France ......................... 251/149.6

Primary Examiner—Gerald A. Michalsky
Assistant Examiner—John C. Fox
Attorney, Agent, or Firm—Dowell & Dowell

[57] ABSTRACT

The present invention relates to fast-fit unions for removably joining pipes, wherein a tubular lock element loaded by a spring carries on its inner wall three teeth offset axially of the union with respect to one another, the central tooth being provided opposite the other two so that, to unlock the two elements of the union, two successive inward displacement maneuvers must be exerted on the lock element, consequently allowing the compressed fluid time in which to be evacuated to the atmosphere.

1 Claim, 6 Drawing Figures

FAST-FIT UNIONS FOR REMOVABLY JOINING PIPES

The present invention relates to improvements in fast-fit unions for removably joining pipes.

It is known that, in their conventional form, devices of this type generally comprise two elements, male and female, adapted to fit hermetically inside each other, at the same time opening a closure valve mounted in the female element. The device is further provided with a locking mechanism arranged to latch the male element axially in the connected position whilst being capable of being released by the user with a view to dissociating said elements. This mechanism is generally constituted by a spring loaded lock element, transversely moveable in the body of the female element and provided with an axial opening adapted to be traversed by the end piece of the male element. This opening includes a projecting tooth sectioned to engage, under the effect of the elastic means associated with the lock, behind an annular shoulder provided on this end on the male element. The elements are thus locked automatically during fitting together, the latching lock element being accessible on the outer wall of the female element in order to actuate unlocking thereof.

This conventional arrangement, which is satisfactory from the point of view of robustness and reliability, presents an appreciable practical drawback when the pipes have a fluid passing therethrough under a relatively high pressure. In such a case, in fact, the expansion of the fluid which, upon disconnection, is in the compressed state in the pipe connected to the male element, provokes, by bearing on the valve as soon as the user releases the lock element, the sudden expulsion of this element out of the body of the female element. The violence of this expulsion may be the cause of more or less serious injury for the personnel.

With a view to overcoming this drawback, it has in the past been proposed to provide the body of the female element of the union with two independent lock elements offset axially with respect to each other so that the disconnection of the two elements necessarily involves two successive manoeuvres, decompression means being provided for the space inside the pipe adjacent to the male element to be connected to the atmosphere at the end of the first manoeuvre. However, the arrangements suggested to this end are relatively complex in construction and unreliable.

The improvements forming the subject matter of the present invention arise from the same functional concept, namely to provide a union in which disconnection can occur only after two successive unlocking manoeuvres in order to allow the compressed fluid in the downstream pipe connected to the male element of the device to escape to the atmosphere, the union according to the invention combining simple manufacture with perfectly reliable operation.

The present invention consists essentially in providing the lock element, which may be monobloc or, on the contrary, may be formed by a plurality of parts, with three teeth offset with respect to one another along the axis of the body of the female element, the central tooth being disposed diametrically opposite the other two so that the initial manoeuvre of the lock element ensures simultaneously, on the one hand, retraction of the innermost tooth with a view to release of the male element and, on the other hand, the bringing of said central tooth into the path of the shoulder of the male element which is thus stopped. Final release necessarily involves firstly the return of the lock element into its rest position which releases the central tooth and which brings the third tooth into the path of the shoulder, followed by a second manoeuvre by the user for retracting this third tooth.

It will be appreciated that the two successive manoeuvres of the lock element require an irreducible minimum time which is sufficient for the decompression operation, which would not be the case if the final release of the male element were obtained by the simple return of the lock element to the rest position. Any violent expulsion of the male element is therefore fully avoided.

The invention will be more readily understood on reading the following description with reference to the accompanying drawings, in which:

FIG. 1 is an axial section through a fast-fit union according to the present invention, the two elements thereof being shown in locked position of connection.

FIGS. 2 and 3 reproduce FIG. 1 in two other respective positions of the elements.

Figure 1:
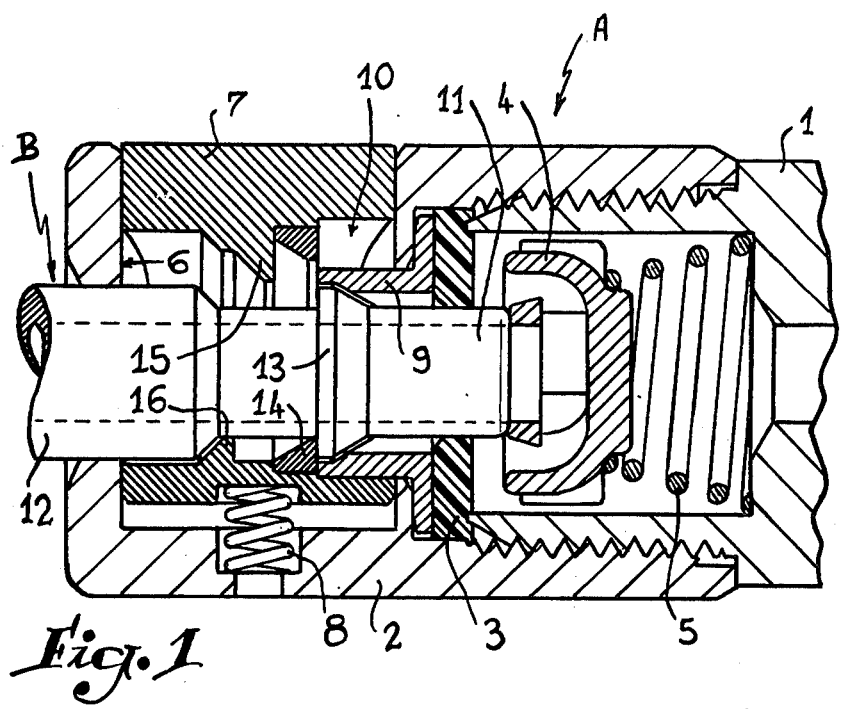
Figure 2:
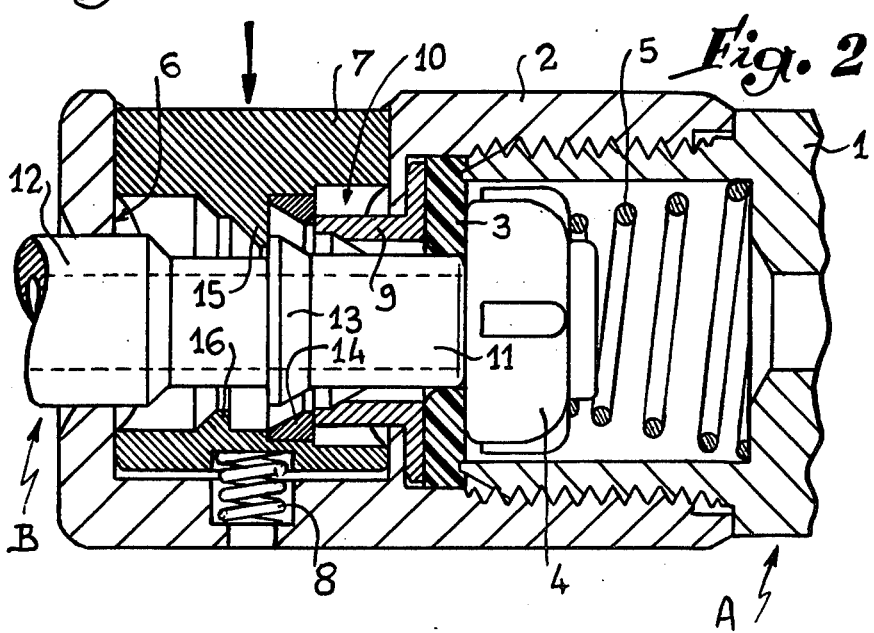
Figure 3:
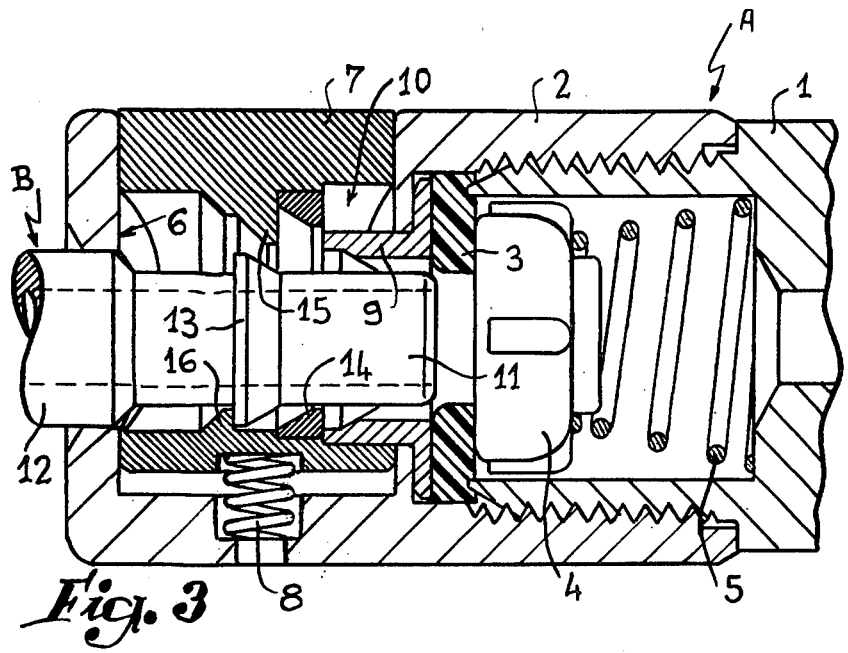

Referring now to the drawings, the body of the female element A of the device illustrated in FIGS. 1 to 3 is constituted, in manner known per se, by two tubular pieces 1 and 2 assembled to each other by screwing, with the interposition of an O-ring 3 which simultaneously forms a seat for a closure valve 4 loaded by a spring 5. In front of this O-ring 3, tubular piece 2 presents a cylindrical bore 6 whose axis is oriented transversely to that of the body 1-2 and inside which is slidably mounted a lock element 7 which a spring 8 tends to repel towards the outside; this displacement is limited by the flange of a ring 9 retained in front of the O-ring 3, which flange is introduced into the rear outlet of an opening 10 made in the lock element 7. This opening 10 is oriented perpendicularly to the axis of the lock element 7 so as to allow insertion fitting of the cylindrical end 11 of the tubular body 12 of the male element B of the device, said end comprising an annular shoulder 13 adapted to cooperate with the lock element 7, as will be seen hereinafter.

According to the invention, the opening 10 of the lock element 7 presents three projecting teeth, spaced with respect to each other along the axis of said opening, said three teeth having been referenced 14, 15, 16, respectively. It should be observed that the innermost tooth 14 and the outermost tooth 16 are provided along the same generatrix of the circular opening 10, whilst the central tooth 15 projects from a generatrix diametrically opposite that corresponding to the two afore-mentioned teeth.

Operation and use of the fast-fit union which has just been described follow from the foregoing description and will be readily understood.

The male element B is fitted inside the female element A in conventional manner, and includes a front face, of truncated conical cross section at the shoulder 13 of the end piece 11. This front face, during the axial displacement of said end piece inside the opening 10 of the lock element, successively bears against the front conical faces, of the teeth 16 and 14 of said lock element which is thus obliged to slide downwardly against its spring 8. The end of the end piece 11 pushes the valve 4 rightwardly which opens, at the same time as the shoulder 13 finally latches behind the inner tooth 14. The male element B is consequently firmly locked axially in the female element A for connection of the pipes associated with said elements (position of FIG. 1).

To disconnect the two elements, the user must exert a first pressure to inwardly displace the lock element 7, against the spring 8. This manoeuvre lowers the lock element and the two teeth 14 and 16, so that the inner tooth 14, upon downward retracting, releases the shoulder 13 of the end element 12, which moves axially outwardly seating the valve 4, and stopping the flow of the pressurised fluid contained in the pipe toward the male element B. However, the above-mentioned manoeuvre of the lock element has simultaneously brought the central tooth 15 to project into the path of expulsion of the shoulder 13, so that it stops the latter with the end piece 11 still sealed in the O-ring 3 in the manner illustrated in FIG. 2.

At that moment, it is indispensable for the operator to release his downward thrust on the lock element 7 so as to allow it to return into its initial position, FIG. 1, under the effect of the spring 8. The central tooth 15 therefore retracts upwardly, which leads to releasing the end piece 11 again, enabling it to continue its leftward stroke. However, the return of the lock element into high position also leads to the return of the outer tooth 16 into the path of the shoulder 13, so that the latter is stopped by said tooth, as shown in FIG. 3. It will be noted that, in this position, the end of the end piece 11 is disposed in front of the O-ring 3, so that the compressed fluid in the downstream pipe associated with the element B may escape to the outside.

The final release of the male element B requires that the operator make a fresh downward thrust manoeuvre on the lock element 7. It will in fact be appreciated that the lowering of this lock element again ensures retraction of the teeth 14 and 16, the latter therefore no longer opposing the manual withdrawal of the male piece 12 from the opening 10 of the lock element. As soon as the thrust on this lock element is released, the spring 8 returns the assembly to the initial position.

As has been set forth hereinabove, this obligation to exert on the lock element two successive thrust manoeuvres separated by a release fully avoids any risk of violent expulsion of the male element, even if the operator works very quickly: the minimum lapse of time involved by these two manoeuvres is sufficient to allow the pressurised fluid contained in the pipe fixed to the male element to escape completely.

Figure 4:
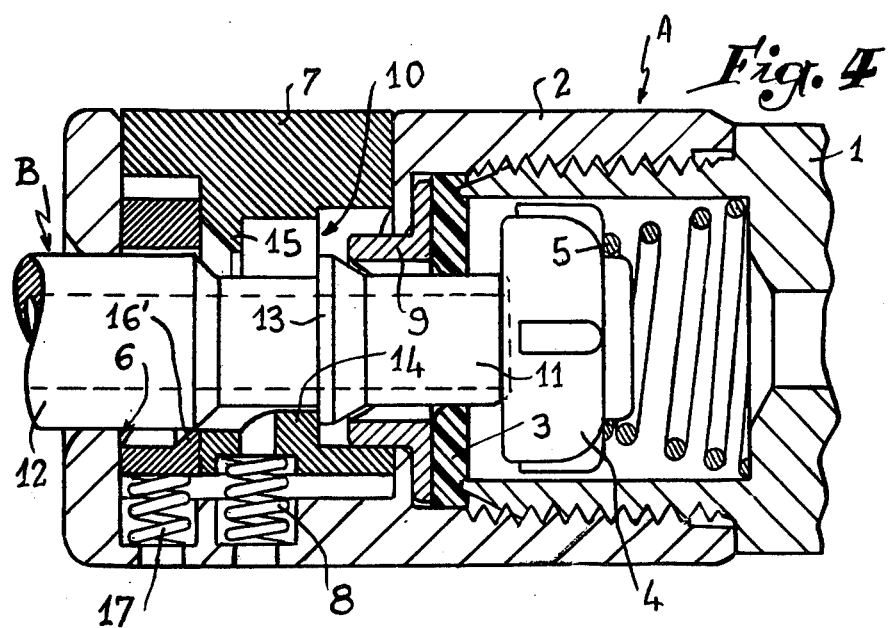
FIGS. 4 and 5 are axial sections similar to those of FIG. 1, but corresponding to two modification embodiments.

In the embodiment illustrated in FIGS. 1 to 3, it has been assumed that, with a view to simplifying manufacture of the lock element, the inner tooth 14 was formed by an independent ring added in an annular space made in the outlet of the opening 10 of said lock element. However, this arrangement is obviously not compulsory and a lock element may very well be envisaged which is constituted by a single piece suitably arranged to comprise, directly, the three teeth longitudinally spaced in the opening 10. In the modified embodiment illustrated in FIG. 4, the two teeth 14 and 15 are directly formed in the opening 10 and it is the outer tooth, referenced 16′, which is constituted by an added ring. However, it will be observed that, in such a case, there must be associated with this ring or tooth 16′, which must have a sufficient radial clearance to allow initial insertion of the end piece 11, a return spring 17 which ensures that it rises after passage of the shoulder 13 and when the lock element 7 is released after the first manoeuvre.

Figure 5:
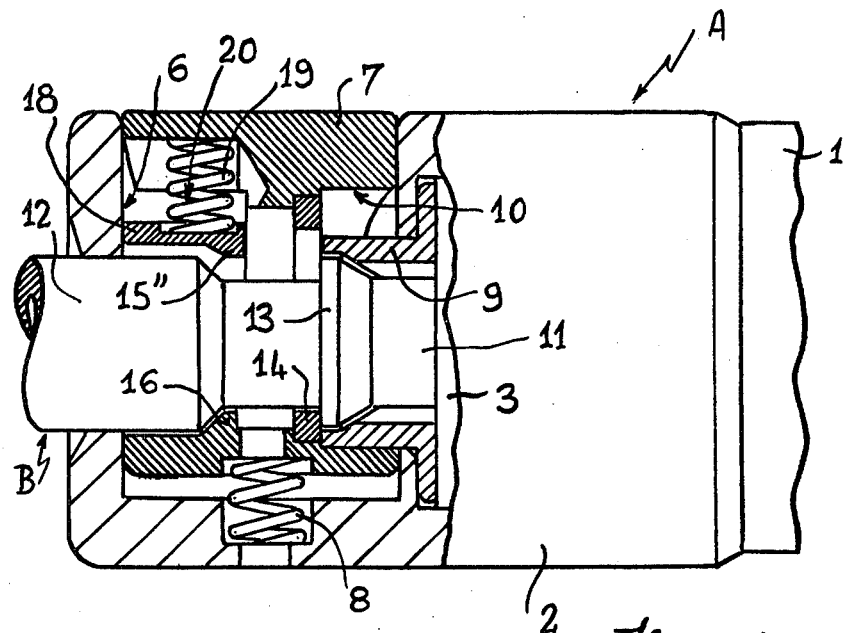
Figure 6:
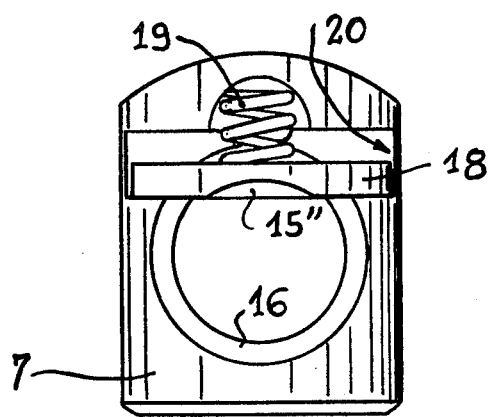
FIG. 6 shows the lock element of the modification of FIG. 5 in separate state.

FIGS. 5 and 6 illustrate another modified embodiment of the invention in which the lock element comprises solely the outer tooth 16, the inner tooth 14 being constituted by an independent ring (as in the case of FIGS. 1 to 3), whilst the central tooth 15″ is borne by an independent plate 18 added in the body 1-2. As illustrated in FIG. 6 which shows the lock element seen from the front. This plate 18, urged by an independent spring 19 which tends to maintain it in lowered position for which its tooth 15″ is disposed on the path of the shoulder 13 of the male element, abuts laterally against the edges of a chamber 20 provided above the opening 10 to allow vertical displacement of the above-mentioned plate.

Operation of these modifications in construction is not modified since, in all cases, the presence of the three teeth spaced apart in the opening of the lock element obliges the operator to make two successive thrust manoeuvres on said lock element in order to totally releasing the male element.

It must, moreover, be understood that the preceding description has been given only by way of example and that it in no way limits the field of the invention, replacement of the details of execution described by any other equivalents not departing from the scope of the invention.

What is claimed is:

1. An improved fast-fit union for removably joining two pipes together, the union being of the type including a male element having an annular shoulder near its free end insertable axially into the free end of a mating female element having a valve therein opened by the free end of the male element when fully inserted, the female element having a transverse bore located between its free end and the valve and the bore slidably supporting a transversely inwardly displaceable locking element which is spring-urged to retract to a rest position and the locking element having an opening extending axially with respect to the female element through which the free end of the male element passes when inserted, the improvement comprising:

(a) three teeth spaced axially from each other along the female element and extending into the opening of the locking element toward the axis of the female element, said teeth including an innermost tooth located closest to the valve, an outermost tooth located closest to the free end of the female element, and a central tooth located between the other teeth;

(b) the innermost and outermost teeth being located on the same side of the locking element opening, and the central tooth being located on the opposite side of said opening therefrom and extending toward the innermost and outermost teeth, and the teeth being oriented such that inward displacement of the locking element displaces the innermost and outermost teeth away from the axis of the female element and displaces said central tooth toward said axis;

(c) whereby a first inward displacement of the locking element releases the innermost tooth from the shoulder on the male element so that the male element moves away from the valve and the shoulder latches against the central tooth, and whereby release of the locking element to retract outwardly to said rest position releases the central tooth from the shoulder so that the male element moves further away from the valve and is vented, and whereby a second inward displacement of the locking element releases the outermost tooth from said shoulder.

* * * * *